United States Patent [19]

LaCroix

[11] Patent Number: 4,693,660
[45] Date of Patent: Sep. 15, 1987

[54] SCISSOR LIFT AND TRANSPORT

[76] Inventor: Lloyd A. LaCroix, P.O. Box 905, 313 2nd St., Lawrenceburg, Tenn. 38464

[21] Appl. No.: 813,092

[22] Filed: Dec. 24, 1985

[51] Int. Cl.⁴ ............................................. B60P 3/00
[52] U.S. Cl. .................................. 414/458; 187/9 R; 254/4 R; 254/122; 414/495
[58] Field of Search ............... 414/458, 459, 460, 461, 414/427, 495; 254/2 R, 4 R, 8 R, 9 R, 10 R, 46, 45, 122; 187/9 R, 8.71, 8.72

[56] References Cited

U.S. PATENT DOCUMENTS

| | | | |
|---|---|---|---|
| 1,817,418 | 8/1931 | Munns | 254/9 R X |
| 2,468,230 | 4/1949 | Pollard | 254/122 X |
| 2,816,675 | 12/1957 | Baker | 414/458 |
| 3,145,863 | 8/1964 | Dunaski | 414/458 |
| 3,472,183 | 10/1969 | Goodman | 254/122 X |
| 3,536,220 | 10/1970 | Coker | 414/458 |
| 3,672,634 | 6/1972 | Chaffin | 414/458 X |
| 3,831,791 | 8/1974 | Gonzales | 414/461 |
| 4,015,736 | 4/1977 | Erickson | 414/458 |
| 4,362,458 | 12/1982 | Jantzi | 414/458 |
| 4,534,544 | 8/1985 | Heide | 254/9 C |

Primary Examiner—Frank E. Werner
Attorney, Agent, or Firm—Richard C. Litman

[57] ABSTRACT

A hand truck has an X frame which is pivoted in the center and a support adapted to engage a load suspended from the tops of the cross members of the X frame. A winch draws a cable which pulls the cross members toward each other raising the height of the frame and lifting the support and any load contained therein.

5 Claims, 6 Drawing Figures

SCISSOR LIFT AND TRANSPORT

BACKGROUND OF THE INVENTION

The present disclosure relates to a lift and transport device for easily lifting and moving bulky and massive loads, such as store fixtures, freezer chests, pianos, bulk cargo containers and the like. As store fixtures such as frozen food cabinets and the like have grown in size and weight, moving these fixtures to their desired position has become an increasingly difficult task requiring the efforts of several men or the use of a fork lift. Furniture which used to be transported in a van, piece by piece, is now commonly moved by placing it in a bulk cargo container which is then transported to the desired destination. The bulk cargo containers must be frequently shifted about while in the warehouse, again commonly requiring several operators or a fork lift. The present invention discloses a device, to be used in pairs, for the movement of heavy and bulky articles by a single operator which enables the operator to lift and move loads which currently might require several movers or a fork lift. The scissor lift and transport provides two swiveling wheels at each end or side of the load to be moved and provides sufficient mechanical advantage so that a lone operator can easily lift the load to be moved from the ground to a height where it is supported by the wheels. Provisions are made for adapting the scissor lift and transport to loads having a wide variety of widths and heights ranging from desks and the like where the lifting point is raised above the floor by supporting legs to refrigerators, freezers and store fixtures where the lifting point is at floor level.

BRIEF SUMMARY OF THE INVENTION

The device of the present invention comprises a cross frame, having two frame members hinged at the midpoint. Supports extending downward from the upper ends of the cross members support lifting flanges for engaging the load to be moved. The intial height of the lifting flanges may be adjusted by positioning the flanges with keyhole slots in the supports. Swivel casters on the lower ends of the cross members provide means for readily moving the load once it has been lifted from the floor. A winch, cable and pulley arrangement in the cross members provides the means for bringing the upper and lower ends of the cross members toward each other, raising the supports and thus the flanges attached to them which are engaging the load. The winch and pulley arrangement provides the mechanical advantage which enables this small device to lift extremely heavy loads. Provision is also made for adjusting the width of the cross frame to adapt it to loads of varying width prior to lifting.

OBJECTS OF THE INVENTION

It is an object of the present invention to provide an improved lifting and transporting device to be used in pairs to lift and move heavy loads which can be readily transported and employed by a single operator.

It is a further object of this invention to provide a compact lifting and transporting device having sufficient mechanical advantage to enable a single operator to lift very heavy loads.

It is still another object of this invention to provide a lifting and transporting device which is adaptable to loads of different widths and to loads having different lifting points.

The method by which these and other objectives are achieved and features of this invention may be better understood by reference to the drawings and to the following detailed description.

DETAILED DESCRIPTION

Figure 1:
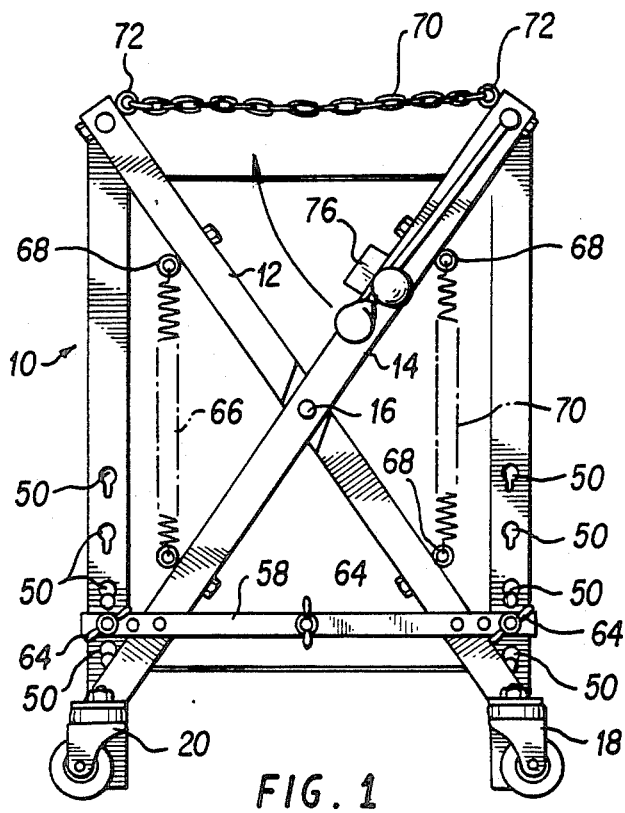
FIG. 1 is a rear view of the scissor lift truck of the present invention.

Referring now to the drawings in detail wherein like reference numerals indicate like parts throughout the several figures, the reference numeral 10 indicates generally a scissor lift and transport constructed in accordance with the invention. The cross frame of scissor lift and transport 10 comprises cross members 12 and 14 which form a cross frame pivoted at pin 16. At the lower ends of cross members 12 and 14 are casters 18 and 20 which provide a wheeled support for scissor lift and transport 10.

Figure 2:
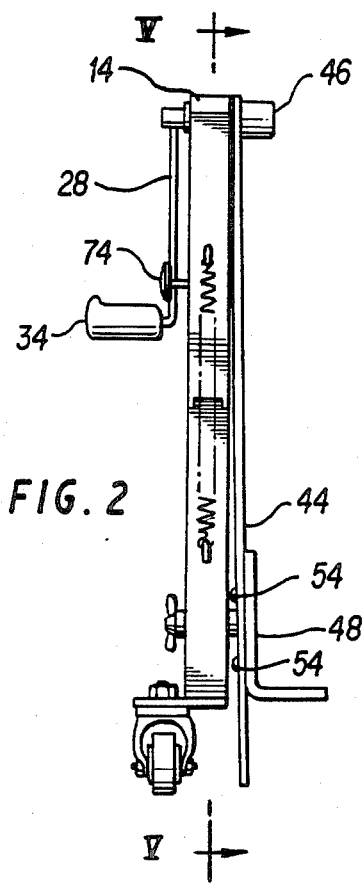
FIG. 2 is a side sectional view through V—V of FIG. 1.
Figure 5:
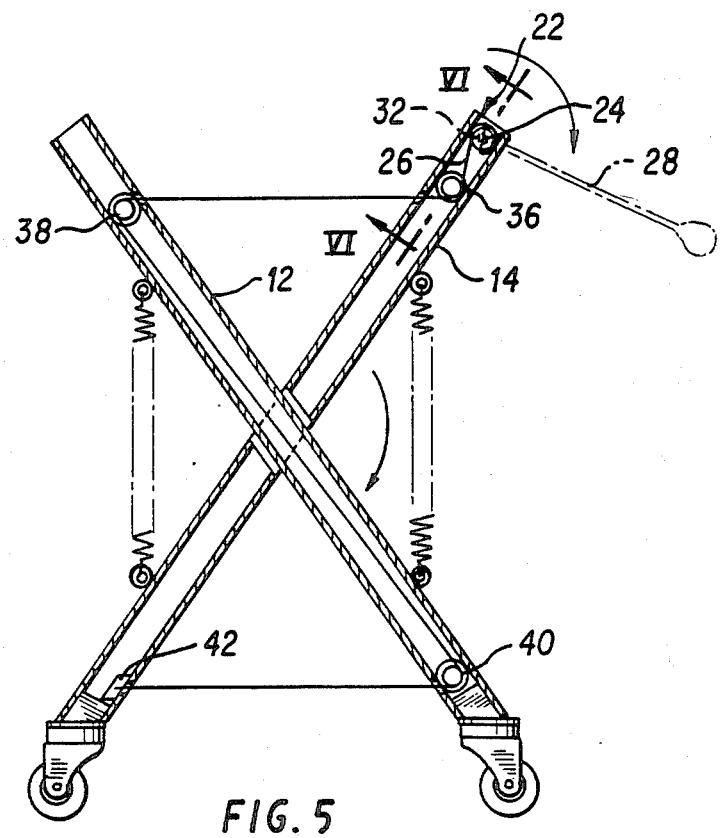
FIG. 5 is a rear sectional view of the truck of FIG. 1 showing the winch, and pulley arrangement which operates the lift.
Figure 6:
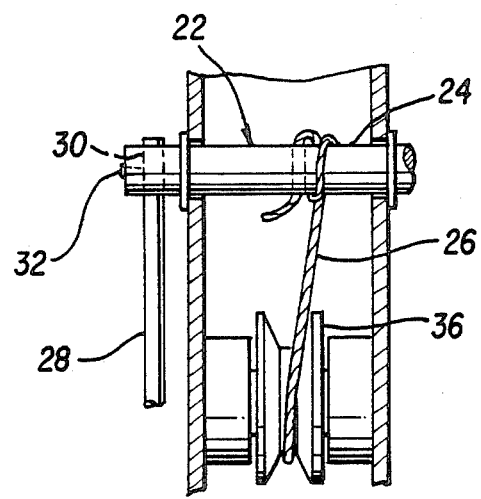
FIG. 6 is a side view of the winch, adjacent pulley and a corresponding short length of cable.

Referring now more particularly to FIGS. 5 and 6 the details of the winch 22 are shown. Winch 22 is made up of a wind up spindle 24 for cable 26. The spindle 24 is turned by crank 28 and is held in place by set screw 32. For storage, set screw 32 can be loosened and crank handle 34 (see FIG. 2) can be turned 90 degrees, so that it is parallel to the frame and out of the way.

In operation spindle 24 is rotated by turning crank 28 by crank handle 34. Cable 26 is wound upon spindle 24, thus shortening the length of cable 26 extending from spindle 24. One pulley 36 is journaled in the upper end of cross member 14, a second pulley 38 is journaled in the upper end of the other cross member 12 and a third pulley 40 is journaled in the lower end of cross member 12. Flexible cable 26 is secured at one end to the lower end of cross member 14 at 42, then trained over pulley 40, pulley 38 and pulley 36 in that order. The winch 22, when turned, draws into cable 26 causing both the upper ends and lower ends of cross members 12 and 14 to move towards each other, thus raising the height of the upper ends.

One support 44 adapted to engage a load is mounted on a circular protrusion at the upper end of cross member 12 by means of a circular mating hole in the upper end of support 44. Support 44 is held in place by bumper 46 which is larger in diameter than the hole in support 44. Bumper 46 is made of plastic having a threaded bolt mounted in the center of its circular diameter which screws into the center of spindle 24 to hold the support 44 in place. Support 44 is adapted to engage a load by the attachment of flange 48 to support 44.

Figure 3:
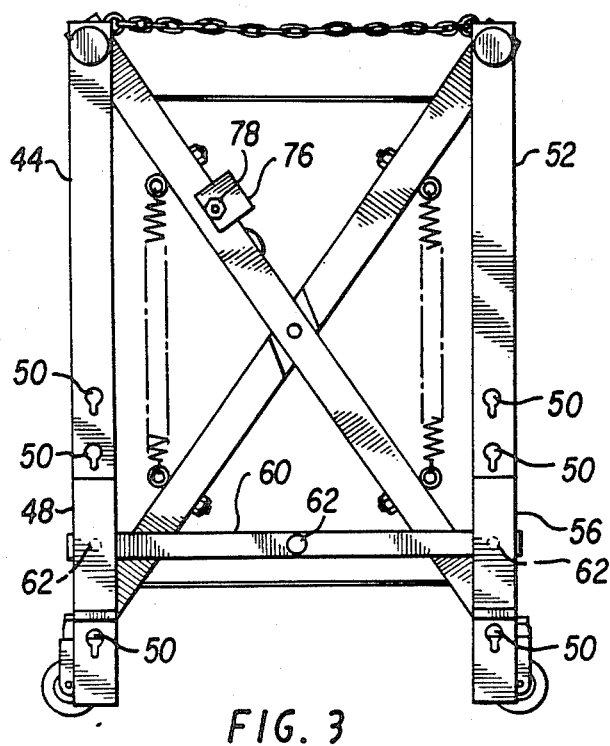
FIG. 3 is a front view of the truck of FIG. 1.
Figure 4:
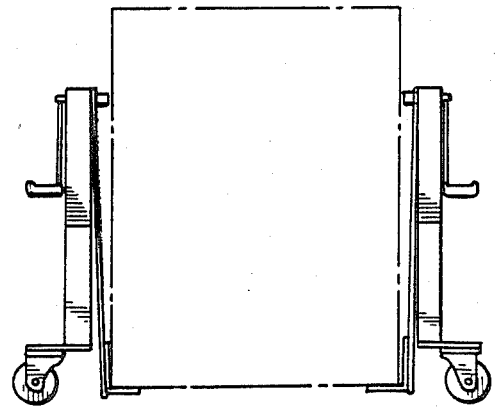
FIG. 4 is a side view of two trucks of FIG. 1 supporting a load.

As is shown in FIG. 3, a series of round holes with downwardly extending slots 50 are positioned at lower lengths of supports 44 and 52. Flange 48 has rivets embedded in one of its flat surfaces and spaced to mate with holes with slots 50. The shafts of the rivets extend form flange 48 a distance equal to the thickness of support 44 and the shafts have the same diameter as the slots of holes with slots 50. The flange 48 is attached to support 44 by inserting two rivets into two holes with slots 50 and allowing the rivets to slide down into the slots locking flange 48 in place. Flange 56 is held in place in the same manner on support 52. The slotted holes 50 allow flanges 48 and 56 to be positioned higher or lower on supports 44 and 52 depending upon how high the load to be contacted is above the floor. For example a desk would be contacted at its frame which would vary in distance from the floor depending on the height of the legs supporting the desk. Tie rods 58 and 60 provide width adjustment for the cross frame and tie rod 60 on the opposite side. The tie rods are separated by spacers (not shown) so that the cross frame members are free to move within the spaced tie rods. Holes in the tie rods permit the spacers to be moved in position to provide an initial width adjusnment for the cross frame members and the supports. Screws 62 and wing nuts 64 retain the spacers in the desired position.

Spring 66 which is attached at one end to eye bolt 68 at the upper part of cross member 12 and the other end of which is attached to eye bolt 68 at the lower part of cross member 14 keeps the cross members 12 and 14 from folding in on themselves. Spring 70 which is attached at one end to eye bolt 68 at the upper part of cross member 14 and at the other end to eye bolt 68 at the lower part of cross member 12 accomplishes the same purpose. Chain 70 attached at one end to eye bolt 72 in the top end of cross member 12 and at the other end to eye bolt 72 in the top end of cross member 14 limits the movement that springs 66 and 70 can impart to cross members 12 and 14.

After a load has been lifted by the rotation of winch 24, spring loaded catch 74 prevents handle 28 from unwinding. Spring loaded catch 74 is moved into place by handle 76 which is affixed to a common pin with catch 74 by nut 78.

The term cable includes wire rope or cord. A ratchet can be used instead of a spring loaded pin to restrain rotation of the winch. The bottom ends of supports 44 and 52 could be bent horizontally to form flanges. A single flanges could be used to engage a load and numerous other modifications could be made without departing from the scope of the following claims.

What is claimed is:

1. A load lifting and transporting mechanism comprising
two cross frame members and having upper ends and lower ends,
a pair of wheels supporting the cross frame members,
a winch mounted on the frame members,
a cable one one end of which is attached to the winch,
the two cross frame members having a pivoted intersection forming an X-shaped configuration,
the winch being positioned in the upper end of one cross member,
a first pulley journaled in the upper end of the second cross member,
a second pulley journaled in the lower end of the second cross member,
a third pulley.
A flexible cable secured at one end to the lower end of the first cross member then trained over the third pulley, second and first pulleys in that order and affixed at another end to the winch, which when turned, draws in the cable causing the upper ends of the cross members to move toward each other and the lower ends to do likewise raising the height of the upper ends,
one support including a flange adapted to engage a load, the support being mounted on each of the upper ends of the cross frame members and the supports so defined with the load being raised with the upper ends,
a horizontal frame member having an open interior enclosing and being slidable about the lower ends of the cross frame members, and
the horizontal frame member having end portions attached at each of the end portions thereof to one of the supports to properly distance the supports.

2. The load lifting device of claim 1 wherein a spring is attached between an upper end of the first cross member and a lower end of the second cross member; and a second spring is attached between an upper end of the second cross member and a lower end of the first cross member.

3. The load lifting device of claim 2 wherein a chain is attached to the upper end of the crossframe member to limit the movement the springs can impart to the the two cross frame members.

4. The load lifting device of claim 3 wherein a spring loaded catch prevents a handle of the winch from unwinding.

5. The load lifting device of claim 1 wherein a restraining means is provided to prevent the winch from unwinding.

* * * * *